(12) United States Patent
Paustian, Jr. et al.

(10) Patent No.: US 7,159,823 B1
(45) Date of Patent: Jan. 9, 2007

(54) RAPID DEPLOYMENT OF TROOPS AND CARGO

(75) Inventors: Paul W. Paustian, Jr., Warner Robins, GA (US); David J. Forrester, Jacksonville, AL (US)

(73) Assignee: Cerberus Institute for Research and Development, Inc., Warner Robins, GA (US)

( * ) Notice: Subject to any disclaimer, the term of this patent is extended or adjusted under 35 U.S.C. 154(b) by 752 days.

(21) Appl. No.: 09/973,005

(22) Filed: Oct. 10, 2001

Related U.S. Application Data

(60) Provisional application No. 60/238,464, filed on Oct. 10, 2000.

(51) Int. Cl.
  *B64C 1/22* (2006.01)
  *B62D 1/08* (2006.01)
(52) U.S. Cl. .................................................. 244/137.1
(58) Field of Classification Search ................ 244/136, 244/137.1, 137.2, 137.4, 138 R, 146, 147, 244/904, 905, 164, 137.3; 193/25 B, 30, 193/25 E, 2 R, 4, 5, 6; 221/27, 28; 182/49, 182/48
See application file for complete search history.

(56) References Cited

U.S. PATENT DOCUMENTS

| | | | | |
|---|---|---|---|---|
| 440,244 A | * | 11/1890 | Bacheller | 182/47 |
| 715,560 A | | 12/1902 | Dedrick | |
| 2,389,160 A | * | 11/1945 | Manson et al. | 182/48 |
| 2,955,299 A | | 10/1960 | Ingram | |
| 3,358,950 A | * | 12/1967 | Welsch et al. | 244/137.2 |
| 3,433,323 A | * | 3/1969 | Ukawa | 182/48 |
| 3,438,601 A | * | 4/1969 | McIntyre | 244/137.2 |
| 3,488,021 A | * | 1/1970 | Renshaw | 141/317 |
| 3,554,344 A | | 1/1971 | Summer | |
| 3,726,375 A | * | 4/1973 | Blate et al. | 182/48 |
| RE27,860 E | * | 1/1974 | Day | 244/905 |
| 3,819,011 A | * | 6/1974 | Kinase et al. | 182/48 |
| 3,840,057 A | | 10/1974 | Lesh, Jr. | |

(Continued)

FOREIGN PATENT DOCUMENTS

DE  3504153  7/1986

(Continued)

*Primary Examiner*—Teri Pham Luu
*Assistant Examiner*—Stephen A Holzen
(74) *Attorney, Agent, or Firm*—James C. Wray

(57) ABSTRACT

A rapid deployment system has an inflatable landing tube with an inflatable exit slide coupled to an aircraft. Connectors couple the landing tube to the aircraft. Flexible retarders extend inward from the inner surface of the tube for retarding gravitational descent of cargo and/or personnel from the aircraft. The tube has tubular segments, with ribs and reinforcements, forming a continuous descent tube. A spine along the tube is retractable telescopically allowing for the tube to be retracted within the aircraft. The tube is connected to exterior edges of any exit port of the aircraft. A window coaming adapter is positioned around the exterior edges and a membrane extending between sides of the adapter expands with the landing tube as the landing tube is inflated. The membrane is of multiple layers with expansion cells between adjacent layers for allowing independent expansion of the layers. The entry port has a shield behind the membrane and connected to the aircraft for protecting the membrane. The shield has a couple of arms lying in a straight line when the landing tube is inactivated and separating and swinging outward from each other when the landing tube is activated. Another shield extends between edges of the exit port sandwiching the membrane between the two shields. An override lock on the one shield prevents that shield from opening automatically.

39 Claims, 4 Drawing Sheets

U.S. PATENT DOCUMENTS

| | | |
|---|---|---|
| 3,968,856 A | 7/1976 | Keen et al. |
| 4,037,685 A | 7/1977 | Talucci |
| 4,099,595 A * | 7/1978 | Tracy .......................... 182/48 |
| 4,162,717 A | 7/1979 | Orii et al. |
| 4,167,224 A | 9/1979 | Kinase et al. |
| 4,180,867 A * | 1/1980 | Ridgeway, Jr. ................... 2/89 |
| 4,240,520 A | 12/1980 | LaGrone et al. |
| 4,246,980 A * | 1/1981 | Miller .......................... 182/48 |
| 4,372,423 A * | 2/1983 | Pelley .......................... 182/42 |
| 4,681,186 A * | 7/1987 | Leisman et al. .............. 182/47 |
| 4,830,141 A | 5/1989 | Montaigne |
| 5,150,765 A | 9/1992 | Chen |
| 5,620,058 A * | 4/1997 | Forrester ..................... 182/48 |
| 6,098,747 A * | 8/2000 | Reece .......................... 182/48 |
| 6,199,676 B1 * | 3/2001 | Targiroff ..................... 156/322 |
| 6,298,970 B1 * | 10/2001 | Targiroff et al. .............. 182/48 |

FOREIGN PATENT DOCUMENTS

| | | |
|---|---|---|
| GB | 2060778 | 5/1981 |
| JP | 53-67999 | 6/1978 |
| SU | 1540834 | 2/1990 |

* cited by examiner

RAPID DEPLOYMENT OF TROOPS AND CARGO

This application claims the benefit of U.S. provisional Application No. 60/238,464 filed Oct. 10, 2000.

BACKGROUND OF THE INVENTION

Rapid deployments of troops and cargo are required in emergency conditions such as fires or flood, in rescue operations, in anti-terrorist operations and in combat operations.

Rapid deployment of troops and cargo may be accomplished by low flying planes which rapidly push cargo sleds with parachutes from rearward-facing loading ramps and which deploy troops with parachutes. Parachute descents or cargo and troops are vulnerable to high winds, hostile fire and forest canopies. Air drop operations are particularly difficult in places that have limited reception areas. Rapid descents by cables from hovering helicopters have been used, but the descents may be relatively slow and require special gear worn by the troops.

Needs exist for improved high speed cargo and troop insertion systems.

SUMMARY OF THE INVENTION

The present invention meets the requirements of rapid deployment by providing rapid safe egress from heavy-lift helicopters and tilt-rotor aircraft. The invention provides an alternative to sled cargo drops.

The tubes of the present invention are particularly useful in emergency cargo and special insertion operations.

The tubes of the present invention provide cargo delivery and troop insertions for high wind states, in limited reception areas, in forest canopies and under hostile fire.

The new invention uses tubes which are about thirty meters in length and one and one-half meters in diameter, delivers cargo and place troops on the ground ready to enter combat environments. Troops emerge standing up with weapons ready and with armor protection at the rear of the troops at the moment of insertion.

Preferred embodiments of the invention use stiffener extruding spines which act as both power ramp and stiffening structure which are extendable hydraulically or pneumatically. Kevlar exteriors on frontal segments of the tubes provide armor protection against hostile fire during descent and upon troop emergence. The present invention uses the retarder systems described in U.S. Pat. No. 5,620,058, the disclosure of which is incorporated herein in its entirety by reference.

The Life Step interior mechanisms described in that patent are used herein.

The present invention uses a retractor mechanism attached to the stiffener extruding spine. After use, the invention may drop the tube and recover the spine and Kevlar shield or recover the entire tube. The invention is provided in a self-contained package which bolts to cargo ramps and internal storage attachments in heavy-lift helicopters or tilt-rotor aircraft. The whole package weighs between about 500 and 1000 pounds. The tubes use a system for inflation of the retarders within the tube similar to automotive airbag inflation, without the rapid deflation features of automotive airbags. Smocks may be provided to troops for use during the sliding through the descent tubes to reduce snags.

Pockets are provided on exteriors of the tubes to hold and allow the deployment of inflated winglets, which provide addition stability at operational speeds.

A preferred stiffener extruding spine telescopes and has about fifteen or more tubes of decreasing diameters in approximately two meter lengths. The tubes operate basically as sliding pistons and are deployed with hydraulic or gas extension. Powered rollers and belts contact outsides of sequential tube sections to recover the tube and to telescope and drive the sections into the storage container upon recovery after deployment.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
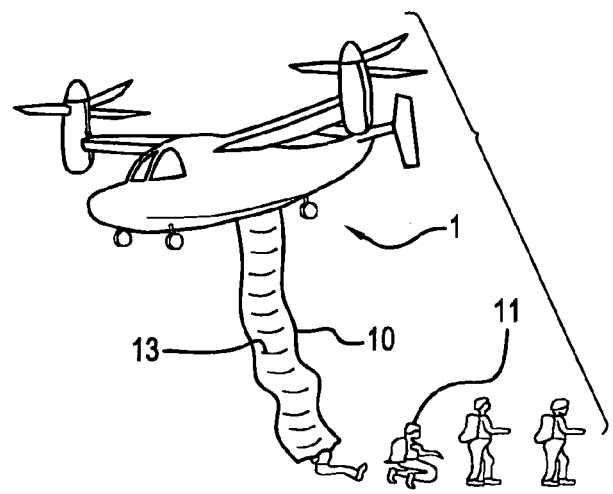
FIG. 1 is a schematic representation showing deployment of troops in rapid safe egress from tilt-rotor aircraft.

Referring to FIG. 1, tilt-rotor aircraft 1 is provided with a landing tube 10 of the present invention. Troops 11 exit the tilt-rotor aircraft 1 through tube 10. Flexible retarders 13 within the tube 10 retard the gravitational descent of the troops which leave the aircraft ready for the combat action.

Figure 2:
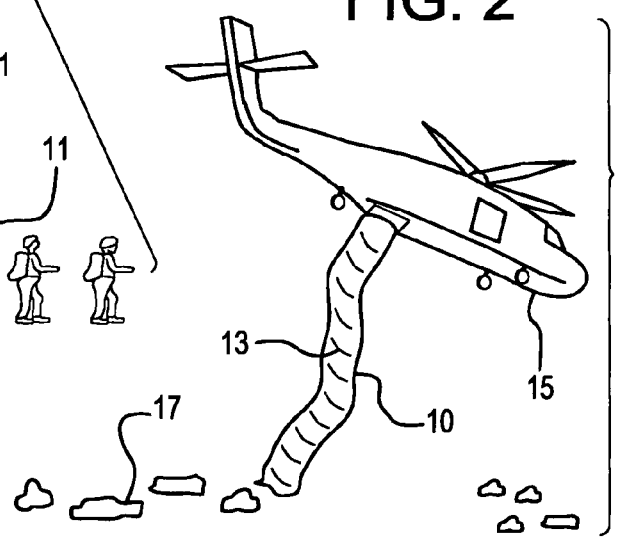
FIG. 2 is a schematic representation of deployment of cargo or troops from a heavy-lift helicopter.

As shown in FIG. 2, a heavy-lift helicopter employs a tube 10 with retarders 13 for dropping cargo 17 which falls under the influence of gravity through the tube 10, impacting and deforming the soft retarders 13. The undamaged cargo 17 exits the bottom of the tube.

Figure 3:
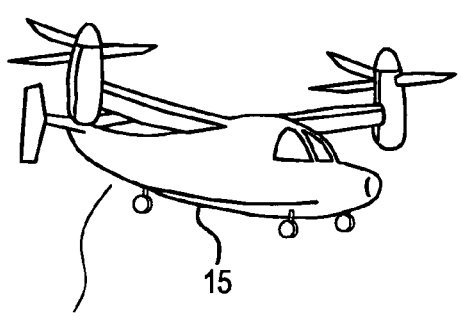
FIG. 3 is a schematic representation of releasing a cargo dropping and troop-descending tube after egress of troops and depositing of cargo.

As shown in FIG. 3, tube 10 may be released from the helicopter 15 after the completion of the cargo drop or troop deployment. Alternatively, the tube may be mechanically raised back into the helicopter 15.

Figure 4:
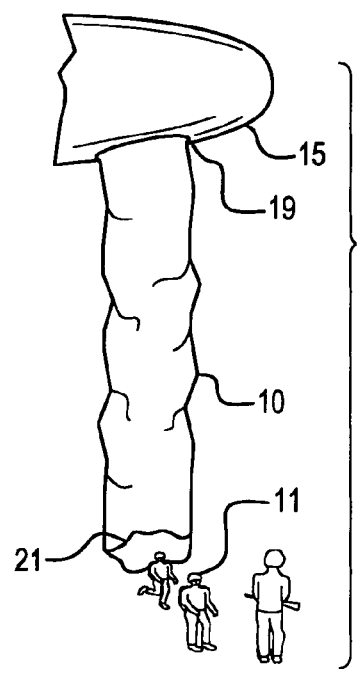
FIG. 4 is a schematic representation of deployment of troops from a heavy-lift helicopter.

As shown in FIG. 4, the gravity retarder tube 10 may be affixed to a cargo opening 19 of a heavy-lift helicopter 15. Troops 11 jump into the descent-retarding tube 10 and exit the bottom 21 of the tube in combat-ready condition.

Figure 5:
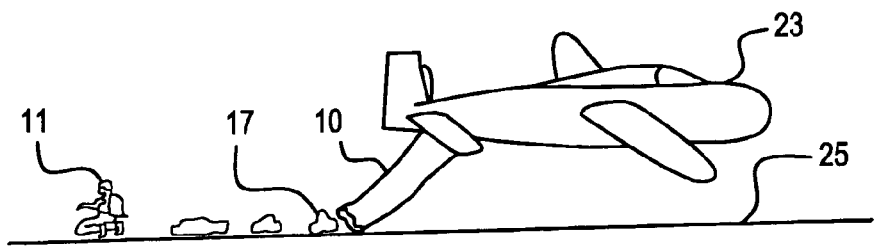
FIG. 5 is a schematic representation of use of the invention with a fixed wing aircraft for emergency cargo and special troop insertion operations.

FIG. 5 shows the use of the gravitational retarding tube 10 on a fixed wing aircraft 23 to deposit cargo 17 or troops 11 on the ground 25 during a low level, low speed flight. Cargo alone may be dropped at a higher speed.

The invention provides rapid safe egress from heavy-lift helicopters and tilt-rotor aircraft for cargo use. The invention provides an alternative to sled cargo drops. When dropped using the present invention, cargo is ready to use without releasing cargo from the heavy sleds. The entire payload may be used for cargo rather than for the buffering and packaging equipment which is discarded. The avoidance of sleds and straps reduces and eliminates waste and trash and reduces critical time of unpacking the cargo for distribution and use.

The invention is particularly useful for emergency cargo drops and special troop insertion operations.

Figure 6:
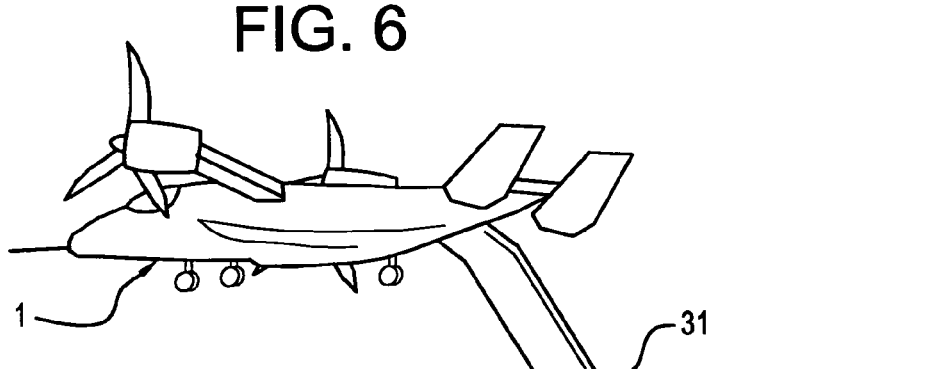
FIG. 6 is a schematic representation of troop insertion using a tilt-rotor aircraft.

FIG. 6 shows a tilt-rotor aircraft 1 moving slowly forward and dragging a descent tube 31 at an angle.

The tube 31 uses the retardation technology described in detail in U.S. Pat. No. 5,620,058, the entirety of which is incorporated herein by reference. The troops 11 hit a cushion or inflatable ramp 27 connected to the bottom of the tube 10.

The present invention as shown in FIG. 6, is preferred for use in troop insertions and is usable in high wind states in limited reception areas with forest canopies and under hostile fire.

Using the present invention, it is possible for troops to enter combat environments standing up with weapons ready while having armor protection at their rear at the moment of insertion.

Figure 7:
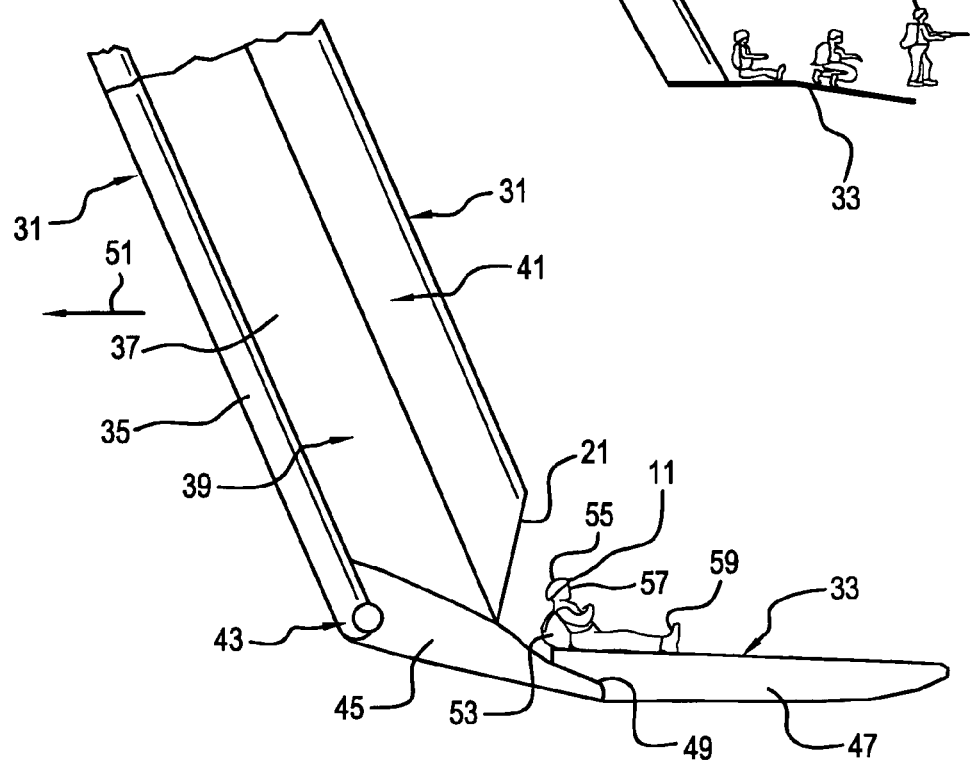
FIG. 7 is a schematic detail of a lower section of the insertion system shown in FIG. 6.

FIG. 7 shows a detail of the tube 31 shown in FIG. 6. Preferably the tube 31 has a stiffener extruding spine 35 which is inflated to rigidity. A Kevlar exterior armor section 37 is provided on the front portion 39 of the tube 31. The rear section 41 of the tube may be left without the Kevlar armor protection. The Kevlar armor protection may surround the tube.

The bottom of the stiffener extruding spine 35 is provided with a flexible hinge 43 to which the inflated ramp 33 is connected.

In a preferred embodiment, the inflated ramp has front and rear sections 45 and 47 which are interconnected 49 to provide flexibility when landing in rough terrain.

The telescoping spine and Kevlar shield are recoverable. Alternatively, the entire tube is recoverable. The whole package weighs between about 500 pounds and 1000 pounds. The entire package uses standard Life Step inflation of retarders as described in U.S. Pat. No. 5,620,058. Inflation is similar to automobile airbag inflation by the gaseous products of rapidly combustible chemicals without the deflation associated with airbags. When the entire tube is recovered plugs are pulled, preferably automatically, to release gas pressure from the internal retarders and the deployed winglets as the tube is recovered. Alternatively, the tube may be dropped from the aircraft and recovered from the ground after the operation is secured.

In one embodiment, troops are provided with slide smocks to reduce possibility of snags during descent. The troops may pull on the slide smocks prior to jumping into the tube. Alternatively, the slide smocks are held open within the tube and the personnel jump into the slide smock. The slide smock is made of friction reducing material, at least on the inside and the entire slide smock drops from the jumper stands up at the bottom of the tube.

Figure 8:
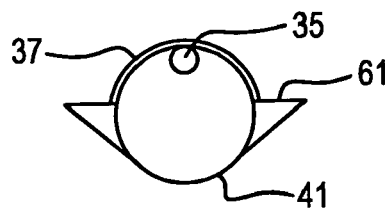
FIG. 8 is a cross-section of the preferred insertion system.

FIG. 8 shows a cross-section of a preferred tube with a stiffener extruding spine 35 shown inside the Kevlar armored coating 37. Inflatable stabilizing winglets 61 are added at exterior sides of tube 41 to provide stability during deployment at speeds.

Figure 9:
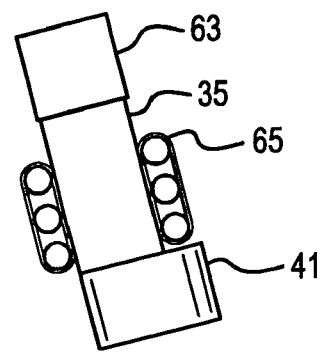
FIG. 9 is a schematic representation of a landing system showing belts and rollers used for retraction.
Figure 10:
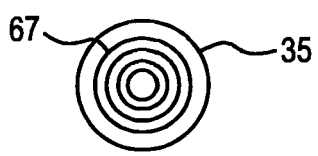
FIG. 10 shows telescoping of sections of the landing system.
Figure 11:
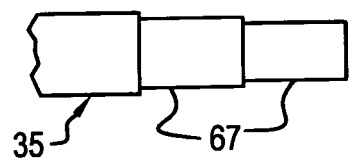
FIG. 11 schematically represents a telescoping spine of the new landing systems.

FIGS. 9, 10 and 11 show stiffener extruding spines telescoped. The spines are held in a storage container 63 which is attached to the aircraft. Retraction is provided via powered rollers 65 which engage outer surfaces of the spine sections. Spine sections 67 are telescoped as shown in FIGS. 10 and 11.

FIG. 9 shows the deflated life step tube 41 which is packaged for release. Upon release of the tube 41, the spine sections 67 slide into the tube or into a long tube within the tube by gravity, by driving in an outward direction by the powered rollers and belt system 65 or preferably by internal pneumatic or hydraulic pressure. The pneumatic pressure may be supplied by rapidly combusting gases as in the case of automotive airbag deployments.

In one preferred embodiment, the stiffener extruding spine has about fifteen segments decreasing in diameter. Each segment is about two meters in length. The structure is basically telescoping pistons which are driven by conventional hydraulic or air pump or air extension systems or by rapidly expanding gas generation systems.

Figure 12:
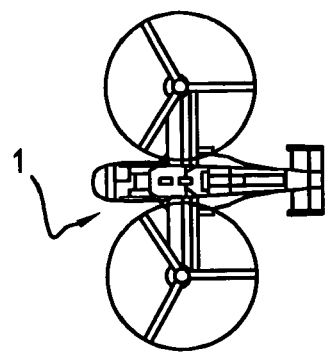
FIGS. 12 and 13 are plan and elevational views of tilt-rotor aircraft suitable for use with present invention.
Figure 13:
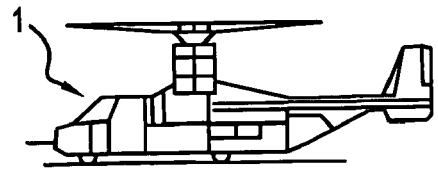

Preferably, the tube is a round tube about one and a half meters in diameter. The tube may have shaped cross-sections of any shape, such as but not limited to, round, ovoid, etc. The Kevlar coating 37 covers the forward side of the tube. The stiffener extruding spine slides within a small tube at the front of the larger tube 41. Preferred tilt-rotor aircraft used with the present invention as shown in FIGS. 12 and 13. The plane is operated by a crew of two and carries twenty-four troops with a fourteen ton troop and cargo capacity, for example. The aircraft is operable with one rotor.

Figure 14:
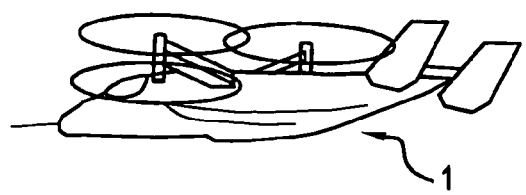
FIG. 14 shows a tilt-rotor aircraft before chute deployment.
Figure 15:
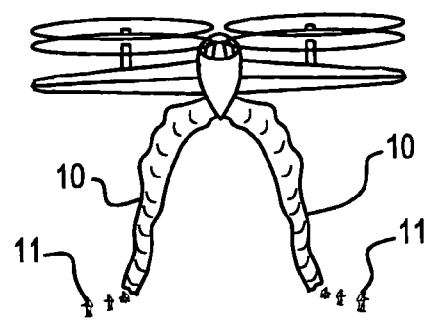
FIG. 15 shows the aircraft after instantaneous deployment of dual tubes for soft landing of troops or cargo.

FIG. 14 schematically shows the preferred tilt-rotor aircraft 1 flying at slow speed or hovering. FIG. 15 shows rapid deployment of troops 11 through two retarder tubes 10.

Figure 16:
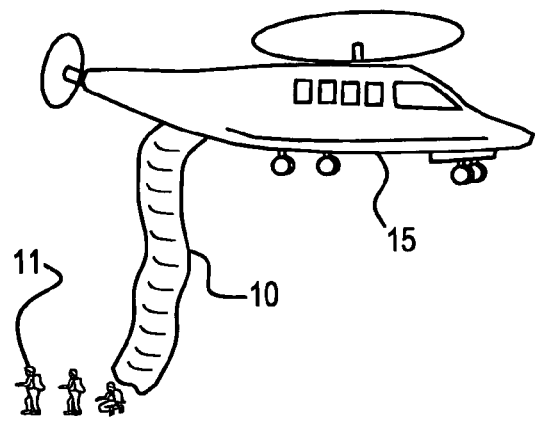
FIGS. 16 and 17 schematically represent the use of chutes for cargo and troop insertion from heavy-lift helicopters.

FIG. 16 shows a heavy-lift helicopter 15 deploying troops 11 through a different descent retarding tube 41.

Figure 17:
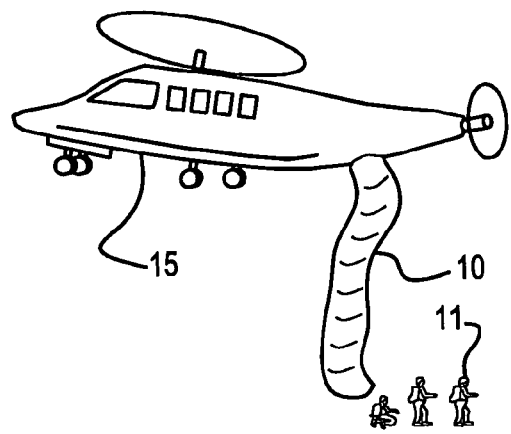

FIG. 17 shows a heavy lift helicopter 15 deploying troops through a gravity descent retarding tube 10.

While the invention has been described with reference to specific embodiments, modifications and variations of the invention may be constructed without departing from the scope of the invention, which is defined in the following claims.

We claim:

1. A rapid deployment system comprising an aircraft, at least one inflatable landing tube coupled to the aircraft, the at least one landing tube comprising an inner surface, an outer surface, a top end and an open bottom end, an inflatable exit slide positioned at the open bottom end of the landing tube, an air source connected to the landing tube and the exit slide for inflating the landing tube and the slide to an optimum pressure, and plural connectors positioned on the landing tube for coupling the landing tube to the aircraft, at least one entry port leading into the landing tube, and plural flexible retarders extending inward from the inner surface of the landing tube for retarding gravitational descent of cargo and personnel from the aircraft, further comprising a spine along the landing tube, the spine being retractable telescopically allowing for the landing tube to be retracted within the aircraft for storing and deployment as needed.

2. The system of claim 1, wherein the landing tube comprises multiple tubular segments connected to each other to form a continuous descent tube.

3. The system of claim 1, wherein the connectors are selected from the group consisting of bolts, adhesives, pitons and drilled holes filled with solidifying compounds.

4. The system of claim 1, wherein the landing tube is connected to an exit port of the aircraft, and wherein the at least one entry port of the landing tube is proximal the exit port of the aircraft.

5. The system of claim 4, wherein the landing tube is free-flowing and detachable from the aircraft.

6. The system of claim 4, wherein the landing tube is connected to exterior edges of the exit port of the aircraft, and wherein the entry port further comprises a window coaming adapter positioned around the exterior edges and a membrane carried by and extending between sides of the adapter, and wherein the membrane expands with the landing tube as the landing tube is inflated.

7. The system of claim 6, wherein the membrane comprises multiple layers and expansion cells between adjacent layers for allowing independent expansion of the layers.

8. The system of claim 4, wherein the exit port of the aircraft is selected from a group consisting of cargo openings, personnel exits, passenger exits, and combinations thereof.

9. The system of claim 6, wherein the entry port of the landing tube has a first shield positioned behind the membrane and connected to the aircraft for protecting the membrane, the shield having a first arm and a second arm, the arms lying in a straight line when the landing tube is inactivated and separating and swinging outward from each other when the landing tube is activated.

10. The system of claim 9, further comprising a second shield extending between edges of the exit port such that the membrane is sandwiched between the first shield and the second shield.

11. The system of claim 9, further comprising an override lock positioned on the first shield to prevent the first shield from opening automatically.

12. The system of claim 7, further comprising ribs positioned in a middle layer of the membrane to assist in expansion of the membrane and to provide form and rigidity to the membrane once the system is deployed, and wherein the ribs are flexible in a horizontal plane and rigid in a vertical plane.

13. The system of claim 12, further comprising reinforced panels connected to the ribs for vertically linking the ribs.

14. The system of claim 12, further comprising wall channels positioned in the exit port for holding the membrane and the ribs.

15. The system of claim 12, further comprising spring loaded ratchet lock mechanisms positioned near the ribs, and wherein each rib has a joint at a center of the rib and a locking groove for catching the spring loaded ratchet lock mechanisms.

16. The system of claim 12, wherein the landing tube, the membrane and the ribs have shaped cross-sections when fully inflated.

17. The system of claim 1, wherein the flexible retarders extend inward from the inner surface of the landing tube and are positioned such that those descending remain along a central region of the landing tube and such that the descent has reducing velocities.

18. The system of claim 17, wherein the flexible retarders comprise diverting slopes on a first side of the landing tube, bouncing bulges on a second side of the landing tube which is opposite the first side, cushions extending along sides of the landing tube between the bouncing bulges and diverting slopes, and friction assistors on the cushions.

19. The system of claim 18, wherein the diverting slopes and the bouncing bulges alternate from a front wall of the landing tube to a back wall of the landing tube along entire lengths of the landing tube.

20. The system of claim 18, further comprising flapper valves on the flexible retarders for absorbing excess energy of those descending and for discharging air from the structures.

21. The system of claim 18, wherein the diverting slopes comprise deflector ramps connected to the landing tube and deflector curtains extending from the deflector ramps.

22. The system of claim 1, further comprising a release bar extending from the tube at the entry port to facilitate entry into the inflated tube.

23. The system of claim 18, wherein the bouncing bulges connected to inner surfaces of the tube comprise an inflated safety core and friction points extending from the core.

24. The system of claim 18, wherein the friction assistors have multiple breakaway cushion quills, and wherein each cushion quill further comprises a friction strand, an inflated cushion connected to the strand, and a breakaway retention and inflation point connected to the inflated cushion.

25. The system of claim 1, wherein the exit slide comprises an inflatable exit ramp.

26. The system of claim 25, further comprising an inflated pendulum barrier extending from the bottom end of the tube toward the exit ramp.

27. The system of claim 25, wherein the exit ramp comprises interconnected front and rear sections to provide flexibility when landing in rough terrain.

28. A rapid deployment system comprising an aircraft, at least one inflatable landing tube coupled to the aircraft, the at least one landing tube comprising an inner surface, an outer surface, a top end and an open bottom end, an inflatable exit slide positioned at the open bottom end of the landing tube, an air source connected to the landing tube and the exit slide for inflating the landing tube and the slide to an optimum pressure, and plural connectors positioned on the landing tube for coupling the landing tube to the aircraft, at least one entry port leading into the landing tube, and plural flexible retarders extending inward from the inner surface of the landing tube for retarding gravitational descent of cargo and personnel from the aircraft, further comprising a spine along the landing tube, the spine being retractable telescopically allowing for the landing tube to be retracted within the aircraft for storing and deployment as needed, wherein the spine comprises stiffener extruding spine sections inside the landing tube with inflatable stabilizing winglets on exterior sides of the landing tube to provide stability during deployment at speeds.

29. The system of claim 28, wherein the stiffener extruding spine sections are telescopically disposed.

30. The system of claim 29, further comprising a storage container on the aircraft for storing the spines.

31. The system of claim 29, further comprising powered rollers and coupled belts engaging outer surfaces of the sections of the spines for telescopically retracting the spines.

32. The system of claim 29, wherein the spine sections are deployable by gravity within the landing tube.

33. The system of claim 32, further comprising drivers for deploying the spine sections.

34. The system of claim 33, wherein the drivers are pneumatic or hydraulic pressure drivers.

35. The system of claim 34, wherein the pneumatic pressure driver comprises rapidly combusting gases.

36. The system of claim 29, wherein the spine sections comprise plural segments in decreasing diameter.

37. The system of claim 29, further comprising a flexible hinge on the spine at the bottom end of the tube for connecting the spine and the exit slide.

38. A rapid deployment system comprising an aircraft, at least one inflatable landing tube coupled to the aircraft, the at least one landing tube comprising an inner surface, an outer surface, a top end and an open bottom end, an inflatable exit slide positioned at the open bottom end of the landing tube, an air source connected to the landing tube and the exit slide for inflating the landing tube and the slide to an optimum pressure, and plural connectors positioned on the landing tube for coupling the landing tube to the aircraft, at least one entry port leading into the landing tube, and plural flexible retarders extending inward from the inner surface of the landing tube for retarding gravitational descent of cargo and personnel from the aircraft, further comprising slide smocks for covering the cargo and the personnel to reduce possibility of snags during descent, and wherein the slide smocks line the inner surface of the tube for easy sliding during descent.

39. The system of claim 17, wherein the flexible retarders are removably attached to the inner surface of the landing tube.

* * * * *